es patent office
2,971,702
Patented Feb. 14, 1961

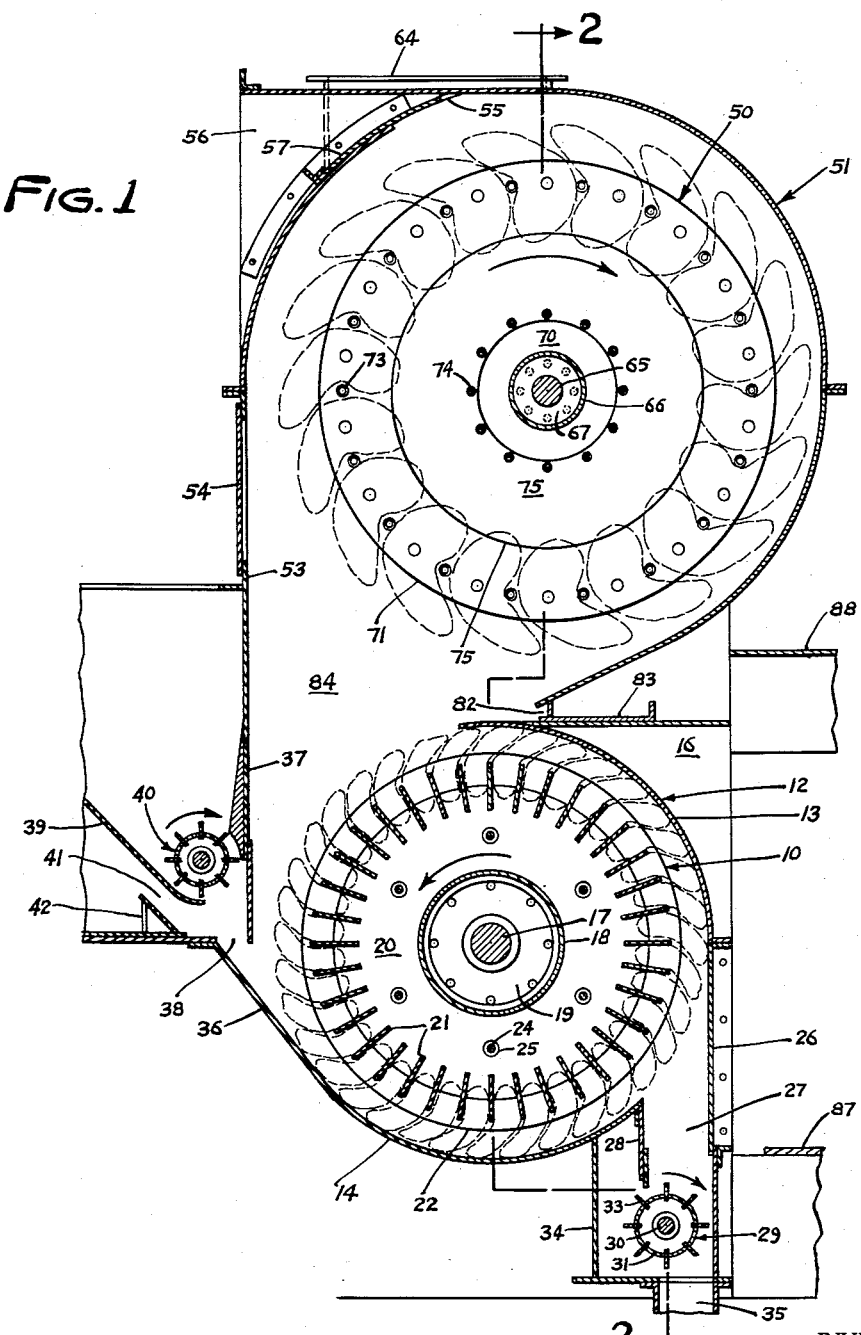

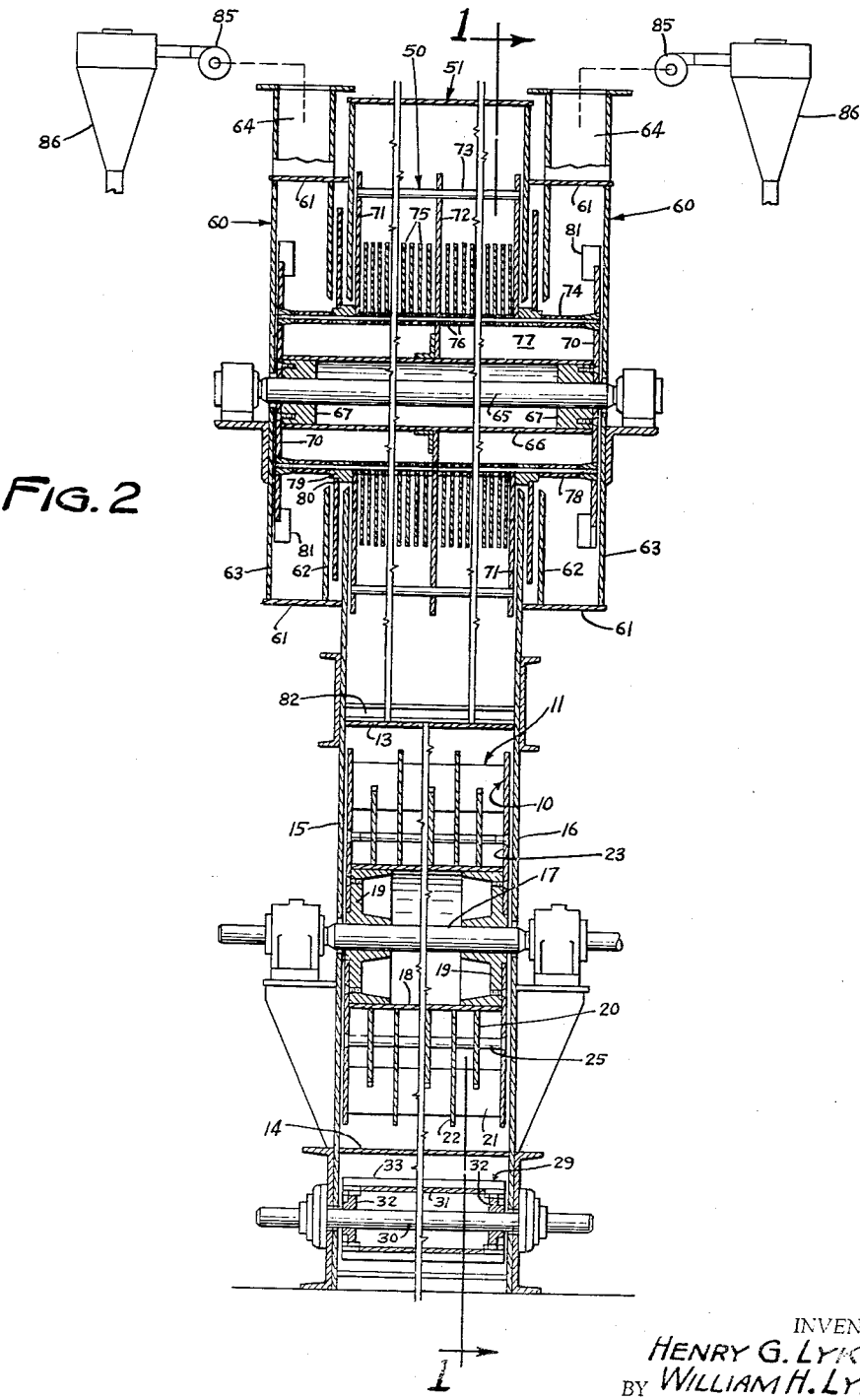

2,971,702
FLUID ENERGY CLASSIFYING MILL

Henry G. Lykken, Minneapolis, and William H. Lykken, Edina, Minn.; Frances Lykken, Hennepin County, Minn., administratrix of said Henry G. Lykken, deceased, assignors to Microcyclomat Co., Minneapolis, Minn., a corporation of Delaware Filed Dec. 16, 1957, Ser. No. 703,077

10 Claims. (Cl. 241—5)

This invention relates to a fluid energy classifying mill for the controlled and progressive reduction of dry solid material and continuous separate extraction of particles in the desired size range and of denser oversize particles. More particularly, this invention relates to an open rotor, dry material, fluid energy reducing and classifying mill having a reducing rotor consisting of an assembly of relatively narrow closed end radial blade grinding units, having a tangential material inlet and tangential material discharge both running the full length of the rotor, and having superimposed above the reducing rotor and functionally associated and integrated with it, a peripheral inlet, centripetal extraction, axial outlet classifying rotor.

The invention is illustrated by the drawings in which the same numerals refer to corresponding parts and in which:

Figure 1 is an end elevation, in section, of the fluid energy classifying mill of this invention, the section being taken along the line 1—1 of Figure 2 and in the direction of the arrows; and Figure 2 is a side elevation, in section, taken on the line 2—2 of Figure 1 and in the direction of the arrows.

The reducing portion of the fluid energy mill and classifier system according to this invention, comprises a lower horizontal axis, peripheral inlet and peripheral discharge reducing rotor indicated generally at 10, and made up of an assembly of a plurality of identical relatively narrow closed end rotor units indicated generally at 11. The reducing rotor is enclosed in a generally cylindrical horizontal chamber 12. The curved side walls of the housing 12 are supported between two end plates 15 and 16 which extend to a base or floor and are affixed by floor flanges or the like.

A suitable bearing structure adequately sized to carry the reducing rotor is mounted at each end of the housing 12 outside of the end plates. Upon these bearings, there is mounted a shaft 17 which carries the reducing rotor. Shaft 17 is driven by any suitable drive means as is well known in the art. The shaft is enlarged and reinforced through part of its length by means of a larger tube 18 supported by heavy annular rings 19 keyed to the shaft. The shaft tube and heavy annular rings form a rigid unitary structure upon which the reducing rotor units 11 are mounted.

The closed end rotor units 11 are comprised of a slotted annular disc 20 perpendicular to the shaft and carrying a plurality of flat radial blades 21 in the slots around its periphery. The radial blades 21 are positioned perpendicular to the sloted discs 20 and each adjacent pair of rotor units 11 is separated by an annular disc 22 having a diameter reaching to the peripheries of the blades 21 or beyond. The reducing rotor units are relatively narrow and a series of rotor units is mounted on the rotor between a pair of end discs 23 mounted on each end of tube 18 and secured to the annular rings 19 by means of bolts or equivalent fastening means.

To impart greater rigidity to the reducing rotor, the several discs 20, 22, and 23 are secured by a plurality of tie bolts 24 passing from end disc to end disc and uniformly arrayed about the shaft 17. The discs 20 are held spaced apart from the end discs 23 and the divider discs 22 by means of spacer sleeves 25 fitted over the tie bolt means 24. Each closed end rotor reducing unit 11 functions independently, being fed from a common tangential feeding means and discharging into a common tangential reducing chamber discharge and classifier chamber inlet means. The reducing rotor 10 may be made up of any desired number of closed end rotor units 11 depending upon the desired capacity of the fluid energy mill and the housing 12 is of a length to just accommodate the rotor with running clearance between the housing end plates and the rotor end discs.

The diameter of the housing is materially greater than the effective diameter of the reducing rotor (as measured from the peripheral edges of the radial blades) in order to provide for a substantial running clearance and the maintenance of a highly fluidal mill load circulating around the rotor in operation. Running clearance should be provided which is in the range from about 7½ to 15 percent of the diameter of the rotor in order to maintain a fluidal mill load containing from about 8 to 12 percent of solids. The density of the mill load, of course, is dependent upon other factors, such as rate of feed, as well as running clearance so that a direct correlation between clearance and density is not possible. A desirable mill load density is about 10 percent solid material and a typical running clearance is about 10 percent of the effective rotor diameter. Thus, for example, a 30" rotor may be housed in a 36" diameter housing to provide a 3" running clearance.

The reducing rotor 10 develops a relatively high axial vacuum proportional to its rotative velocity. The axial vacuum is due to a high centripetal discharge on the forward or leading face of each radial blade 21 and to the velocity of recession at the back of each blade when the rotor is operated at relatively high rotative speeds. This produces a high velocity inrush of the material to be reduced into the rotor back of each blade with a corresponding discharge on the forward face of the next following blade. The velocity at which the inrush of material occurs is substantially higher than the peripheral velocity of the rotor. The high velocity in-and-out flow between each pair of radial blades induces an intense fluid energy intra-blade vortex action which, in turn, causes an intense fluid energy grinding action in and at the periphery of the rotor.

A sustained high energy level and continuous impulse action is thus maintained around the periphery of the rotor. The particles of material to be reduced are continuously drawn into the periphery of the rotor and continuously discharged and, in the course of this in-and-out flow, they are reduced by metallic bursting impact and by fluid energy vortex attrition. A highly fluidal feed and mill load is essential to allow individual particles individual freedom of motion and maximum inter-particle velocity. The rotor acts as a peripheral inlet and discharge fan which not only continuously circulates the fluidal mill load about the rotor but at the same time continuously circulates a percentage of scavaging air for discharging fines from the top of the rotor with every revolution.

The horizontal arcuate plate 13 of the reducing rotor housing 12 defines approximately a quarter cylinder around the upper rearward quadrant of the rotor and the horizontal arcuate plate 14 defines about a quarter cylinder around the lower quadrant of the rotor. The space in between defines the entrance to a dense material segregating zone. A flat plate 26 supported between the end plates 15 and 16 projects downwardly from the lowermost edge of the arcuate plate 13 and defines part of the rear wall of the reducing rotor chamber and a material segregating chamber 27 below the rotor housing. The segregating chamber 27 is open around about 1/8 of the periphery of the rotor housing. The front wall of the segregating chamber 27 is defined by a vertical plate 28 extending the full length of the rotor between the end plates 15 and 16 and depending from the rearward edge of the arcuate bottom plate 14.

The bottom of the segregating chamber 27 is closed by means of a metering roll closure indicated generally at 29 and comprised of a shaft 30 journalled for rotation in suitable bearing structures mounted on the end plates 15 and 16, an enlarging tube 31 supported by heavy annular rings 32 keyed to the shaft and a plurality of radiating longitudinal blades or paddles 33 carried on the tube. The metering closure 29 is enclosed in a rectangular box-like housing 34 which extends the length of the rotor between the end plates. A chute 35 communicates with the bottom of housing 34 to carry away material discharged through the segregating chamber.

The forward edge of the bottom arcuate plate 14 projects tangentially forwardly and upwardly at 36 beyond the lower edge of the front wall 37 of the housing to form a projecting lip which is the air and material inlet 38 to the housing. A feed hopper 39 extending the full length of the rotor housing is disposed outside of the front wall 37 and above the tangential inlet 38. The bottom of the feed hopper is provided with a metering closure 40 similar in construction to the metering closure 29 of the segregating chamber already described. The space between the feed hopper and inlet 38 to the housing defines an air inlet 41. The volume of air admitted through the air inlet 41 may be regulated by means of a slide damper 42.

Integrated classifier means are located above the reducing rotor and include a horizontal peripheral inlet, centripetal flow, and axial outlet classifier rotor indicated generally at 50, enclosed in a horizontal generally cylindrical housing 51 extending around about 3/4 of the periphery of the rotor. The classifier housing 51 includes a front forward wall 53 which is, in effect, an extension of the front wall 37 of the reducing rotor housing 12. The front wall 53 desirably includes a viewing window 54.

An air inlet 55 is provided at the top of the classifier rotor housing. Air inlet 55 is in communication with an air duct 56. Admission of air through the inlet 55 is regulated and controlled by means of an arcuate slide damper 57. The air inlet means extends the full length of the classifier housing 51 which, in turn, is the same length as the reducing rotor housing 12. Inlet 55 is the principal source of air for classification and a large volume of air is introduced to maintain the classifier load in a more highly fluid and dispersed state than the corresponding mill load.

The classifier housing 51 is supported between the upper ends of end plates 15 and 16. Spaced apart from the classifying chamber housing 51 at each end is a fan housing 60 including a scroll wall 61 held between an inner end wall 62 and an outer end wall 63. The fan housing scroll communicates with a discharge duct 64 through which classified material is passed through an air separator and collector system. The fan housing scroll wall 61 is preferably welded to the outer surface of the classifier housing end plates for greater rigidity.

A sutiable bearing structure adequately sized to carry the classifier rotor and fans is mounted outside of the fan housing end walls 63. A shaft 65 is mounted on these bearings. The shaft may be driven by any suitable drive means as is well understood in this art. The shaft 65 is enlarged and reinforced through part of its length by a tube 66 supported by heavy annular rings 67 keyed to the shaft. The reinforced and enlarged portion of the shaft extends through annular openings in the classifier housing and fan housings. Each of the annular rings 67 carries a fan disc 70.

The classifier rotor is in the form of a cylindrical cage which is enclosed between a pair of annular end discs 71 positioned just inside of the classifier housing end walls. The classifier rotor is subdivided into a plurality of independently acting units by means of an annular divider ring 72 which is mounted on the shaft tube 66 and provides central support for the classifier rotor. Each of the discs 71 and ring 72 is provided adjacent its periphery with a plurality of openings for receiving rods 73 or other suitable blading which extend the entire length of the classifying zone and form the outer cylindrical cage wall of the classifying rotor. Rods 73 are parallel to each other and to the shaft 65. It will be noted in Figure 1 that only every other opening provided adjacent the periphery of discs 71 is occupied by a rod. This, of course, has the effect of providing a wider inlet port to the classifier rotor and for some purposes where a narrower inlet port is desirable, additional rods may be interposed. Likewise, where wider inlet ports may be desirable, the rods may be disposed, for example, in only every third opening.

Spaced inwardly from the rods 73 are a plurality of other smaller openings for receiving rods or tie bolts 74 which extend the entire distance between the pair of fan discs 70. A plurality of radiating fins or classifying discs 75 are mounted on the tie bolts 74 between the rotor end discs 71 and center discs 72 to form a finned drum-like structure within the classifying rotor cage. Spacing washers 76 on the tie bolts 74 between the classifying discs 75 hold the discs spaced apart and with the discs define discharge ports to the axial space 77 formed between the inner peripheries of the discs 75 and the surface of the shaft tube 66. The classifier housing end walls and the inner fan housing end walls 62 are each provided with an enlarged annular opening to receive the cylindrical structure defined generally by the plurality of tie bolts 74. The classifier rotor structure is held spaced apart from the fan discs 70 by means of spacer tubes 78 on the tie bolts and an annular ring 79 which carries an annular shielding disc 80 which rotates in the space between the classifier housing and the inner fan housing end wall 62.

Fan blades 81 are secured to the fan discs 70. The fan blades are relatively small and function primarily to unify the air flow from the axial duct 77 of the classifier rotor to the discharge duct 64 since an outside source of suction is employed to draw the stream of entrained particles from the classifier.

A supplemental air inlet 82 running the length of the reducing and classifying rotors is provided between the top of the reducing rotor housing 12 and the bottom of the classifying rotor housing 51. Admission of air through the opening 82 is regulated and controlled by means of a slide damper 83.

The space 84 between the reducing rotor housing 12 and the classifier rotor housing 51 serves as a tangential peripheral discharge chamber from the reducing rotor and tangential inlet into the classifying rotor. At the same time, it serves as a return duct for coarse particles rejected by the classifier and returned to the reducing rotor for further reduction. Air entering through inlet 82 has the effect of sifting through the stream of coarser particles being returned to the reducing rotor chamber for further reduction and of separating any finer particles which may be entrained with or clinging to the larger particles.

Flow of air through the classifying rotor is induced by exhaust fan 85 indicated diagrammatically and connected to the discharge duct 64 from the classifier. Air is separated from the particles and the particles are collected in a conventional air collector and separator system indicated diagrammatically at 86. Depending upon the relative capacities of the classifier and the collector systems, the discharge from both ducts 64 may go to a single collector system, or to separate collectors as illustrated.

Portions of platforms 87 and 88 which serve as motor mounts for the reducing rotor drive motor and classifying rotor drive motor respectively are shown in Figure 1.

The metering closure 40 of the feed hopper 39 is preferably driven by a variable drive motor interlocked, as is well known in the art, with the drive motor for the reducing rotor. In this manner, the material feed rate may be automatically regulated to maintain a mill load of desired density continuously circulating about the reducing rotor. The metering closure 29 of the segregating chamber 27 is also preferably driven by a variable drive electric motor interlocked with either the feeder motor or the reducing rotor drive motor to withdraw a predetermined proportion of the total feed through the segregating chamber.

Depending upon the particular application of the apparatus, the material withdrawn through the segregating chamber may be a desired fraction of particular coarser particle size usable as such or it may be a contaminating material to be withdrawn and thrown away. When the apparatus of this invention is used in the flour milling industry, for example, coarser granulated endosperm and germ may be withdrawn through the segregating chamber. This material may then be fractionated in conventional sifter devices. The coarsest endosperm fraction may then be returned for further reduction, the finest fiber-free endosperm fraction may be purified and blended directly into flour and an intermediate fraction which may consist of some endosperm and germ may be subjected to further separation.

The operation of the fluid energy classifying mill of this invention comprises a combination of integrated interdependent aerodynamic fluidal reactions and effects. The fluidal reactions consist of:

(A) A continuously recirculating fluidal flow around the reducing rotor. This circulating flow is induced by the rotation of the reducing rotor and is independent of any air flow through the mill. That is, the circulating flow around the reducing rotor would take place if the reducing rotor housing were closed and whether or not the classifying rotor is rotated simultaneously. Under preferred operating conditions, the recirculating flow around the reducing rotor is characterized by a constant volume and constant controlled density of material, preferably in the range of from about 6 to 12 pounds of material per cubic foot of volume in the circulating mass. Provision is made for automatic control of the density of the circulating flow from the reducing rotor itself by means of an interlock between the reducing rotor and the material inlet. As the circulating flow becomes more dense, the power requirements for maintaining a given rotor speed become greater and immediately this need for greater energy is compensated by corresponding lesser energy to the drive of the material feed inlet to immediately reduce the amount of material introduced to the reducing rotor. Conversely, as the circulating flow around the reducing rotor becomes lighter than desired, a compensating increase in feed rate occurs to maintain the desired flow density.

(B) A continuously recirculating fluidal flow around the classifier rotor actuated and maintained by rotation of the classifier rotor. This is also an independent flow, similar to that of the reducing rotor, which is created by rotation of the classifier rotor alone. That is, the flow will result if the classifier rotor is rotated in a closed classifier housing regardless of whether there is any air flow through the housing or whether the reducing rotor is simultaneously rotated.

(C) A continuously recirculating figure eight fluidal flow around the top of the classifier rotor, thence down and out of the classifier chamber into the tangential discharge of the reducing rotor housing for returning classifier rejects for further reduction, thence around the reducing rotor with its bound and continuously recirculating flow discharging at the top of the mill rotor, and then up and into the classifier chamber and again around the classifier rotor. This flow acts as a scavenging flow and continuously extracts the superfines from the reducing rotor and transports them to the classifier chamber. This flow is actuated by the combined actions of the reducing rotor and the classifier rotor and the suction flow through the reducing and classifying chambers. It is the product of interaction among the recirculating rotor flows and the suction flow. For part of its course around the reducing rotor and the classifying rotor, the figure 8 flow becomes intermingled with the circulating flows and follows their paths about the peripheries of the rotors but in the expansion space between the rotors, the figure 8 flow breaks away and defines its own independent path.

(D) A product withdrawal suction flow which enters the top of the classifier housing tangentially to the classifying rotor and thence passes over and around the classifying rotor with its own bound and continuously recirculating flow and thence centripetally into the rotor and axially out through the discharge duct to the exhaust fan and collector system. This product withdrawal flow is actuated and maintained by the exhaust fan. It is regulated upon the basis of constant volumetric flow through the classifier independent of variations in resistance to flow either in the reducing rotor chamber, the classifier or the collector system. As is well known in the art, the flow is controlled by maintaining the volume constant and by varying the static suction of the fan. The constant volume flow is maintained by suitable adjusting means in the exhaust connection between the classifier discharge duct and the exhaust fan.

(E) In addition to the enumerated specific air flows, A, B, C and D, there is also a high velocity alternating intra-blade vortex action flow into and out of the peripheries of both the reducing rotor and the classifying rotor induced by the rotation of those rotors.

In the operation of the apparatus of this invention, the material to be reduced and classified is continuously fed from hopper 39 by means of the metering closure 40 through tangential inlet 38 to the reducing rotor housing. The feed material is introduced uniformly along the entire length of the reducing rotor and in sufficiently small amounts to maintain the desired gas-to-solids relationship. The reducing rotor rotating at relatively high speed acts as a peripheral fan and serves to draw the feed material into the continuously circulating air flow A around the rotor 10. The ample running clearance between the periphery of the rotor and the cylindrical walls of the rotor housing insures the maintenance of a highly fluid and dispersed circulating mill load.

The material undergoes reduction as a result of intense intra-blade vortex action in the alternating in and out air flow E. The coarser and lesser reduced material is allowed to escape from the circulating flow around the rotor and is thrown centrifugally outwardly against the rear wall 26 of the reducing rotor housing and segregating chamber 27 from whence it may fall into the segregating chamber. The denser and heavier coarse particles thus thrown out eventually gravitate to the bottom of the segregating chamber and are progressively removed. Coarse particles which are carried past the segregating chamber 27 are thrown centrifugally outwardly into the expansion space 84 and against the front wall 37 of the reducing rotor housing from whence they fall back into the circulating stream around the reducing rotor for further reduction.

The fine particles produced as a result of their travel around the reducing rotor are entrained in the chamber 84 in a rising air stream forming part of the figure 8 flow C and are drawn into the continuously circulating flow B around the rotating classifying rotor 50. Even greater fluidity is maintained in the air stream above the classifying rotor as a result of additional air drawn in through the air inlet 55. As an example, the air to solids ratio within the classifying rotor housing may be only 1/10 of that in the reducing rotor housing. The spaced peripheral rods 73 of the classifying rotor cage create an intra-blade vortex circulation which acts as a pre-classification flow into and out of the periphery of the rotor. The finer particles circulate in an alternating in and out path (flow E) by which the finest particles enter deeper into the rotor while the coarser particles circulate in a path which enters less deeply into the rotor. The result is a graded pattern of flows ranging from coarser to finer, depending upon the depth to which the path penetrates into the rotor.

Superimposed upon this pre-classifying effect created by the rotation of the classifying rotor cage is the flow of air D created by the suction of the external exhaust fan 85 into the top of the classifying chamber, around and into the classifying rotor, through the peripheral rods and classifying discs, into the axial discharge duct 77 and through the fan housing and discharge duct to the collector system 86. The effect of this large volume of superimposed air is to greatly dilute the circulating load around the classifier and to extend and draw inwardly the intra-blade vortex flows within the classifying rotor. This stretching of the intra-blade vortex flows tends to separate the flow paths of the finest particles inwardly from those of the less fine and those inwardly from the coarse, etc.

Thus, the paths in classifying rotor flow E of the finest particles of desired size are drawn deeply enough into the rotor that the centripetal drag effect of the superimposed air flow D exceeds the centrifugal throw-out effect of the rotor. The particles of desired size then are drawn through the rotor to the axial outlet duct 77 and thence on through the fan housing to the exhaust fan and collector system. Because the particles in the course of their circulation about the classifying rotor repeatedly enter into the rotor and repeatedly approach the threshold where the centrifugal throw-out is overcome, there is a wide margin of safety and if a particle of desired size is not picked off and withdrawn the first time, it presents itself to the threshold of acceptance it will eventually be withdrawn on one of its repeated return trips which occur many times each second.

The coarsest particles are thrown out centrifugally against the classifier housing wall and return along the wall by gravity and the downward part of figure 8 air flow C back to the reducing rotor housing for further reduction. In the course of their passage back to the reducing zone, the coarser particles may be subjected to auxiliary air admitted through the inlet 82 along the length of the rotors so that any finer particles which may be entrained with the oversize are separated and carried back upwardly for another pass around the classification rotor. The stripped oversize particles are then returned for another pass around the reducing rotor.

For normal operation the reducing rotor is operated at a peripheral speed of from about 20,000 to 35,000 feet per minute varying with the breakdown resistance of the material to be reduced. In the event the material fed requires no other reduction than disintegration and thorough dispersal in the air, or in the event the wanted material is of the required fineness and it is not desired to reduce harder unwanted material, such as contaminating sand and grit in kaolin, the reducing rotor is operated only at a nominal speed of a few hundred r.p.m. adjusted to the particular requirements (i.e., about 800 to 1500 r.p.m.).

The contaminating material is then withdrawn from below the rotor at the bottom of the reducing rotor housing as it accumulates. The reducing rotor, as an integral element of the classifying process, acts to disperse the material as individual particles in the air and to aerate each and every particle to provide it with an individual film of air as an essential preclassification operation.

The classifying rotor is operated at a peripheral velocity ranging from about 2000 to 9000 feet per minute, that is, from about 200 to 1000 r.p.m. for a typical rotor 36" in diameter, to cover a range of particle size extraction from all minus 35 microns to all minus 1 micron. Rotor speed varies with the nature and specific gravity of the material.

The classifier rotor operates in a housing with a running clearance varying from about 10 to 12 percent of the rotor diameter. Its main feature is the fact that due to its design, integration with a reducing and/or disintegrating and dispersing rotor and possible large volumetric capacity, it can be operated at a very low velocity to obtain the required centrifugal throw-out effect with correspondingly low centripetal air flow requirements. This effects a very substantial saving, not only in quantity of air per pound of product, but a large saving in power requirements as well.

The apparatus of this invention may be operated to separate a stream of reduced particles into two fractions with little or no further reduction. When operated in this manner, the reducing rotor functions primarily as a fluidizing and segregating rotor to thoroughly aerate and distribute the particles. The coarser particles are discharged into the segregating chamber and withdrawn from the bottom of the housing and the finer fraction is entrained in the figure eight flow to the classifier. The finer fraction is withdrawn through the classifying rotor and discharged to the collector system. Any coarser particles entrained with the fine particles which find their way to the classifier rotor are rejected by that rotor and returned to the lower rotor for eventual discharge through the bottom of the housing.

The desired material density of about 8 to 12 percent solids is maintained by introducing the material to the housing at the rate of from about 6 to 12 pounds per cubic foot of air. Approximately the same weight of material per cubic foot of air is introduced to the reducing rotor regardless of the density of the material to be reduced since the power requirements for reduction are generally the same. This permits the denser materials which are generally harder to reduce greater freedom of action than less dense materials which are generally easier to reduce.

The apparatus of this invention is designed for large capacity use. A typical large capacity reducing rotor, for example, may have a diameter of from 30" to 36" or more and an axial length of at least 36". A mill of this size has an operating capacity of several tons per hour. The reducing and classifying rotors are both of the same length but the diameter of the classifying rotor may vary with the particular particle size requirements of the apparatus. A classifier rotor of larger diameter is required, for example, in particle size ranges at the small end of the scale such as 1 micron and finer. In the illustrated embodiment the diameter of the classifying rotor is more than 25 percent greater than that of the reducing rotor.

It is apparent that many modifications and variations of this invention as hereinbefore set forth may be made without departing from the spirit and scope thereof. The specific embodiments described are given by way of example only and the invention is limited only by the terms of the appended claims.

We claim:

1. An open rotor dry material fluid energy classifying mill having a horizontal axis reducing rotor consisting of an assembly of relatively narrow closed end radial blade rotor units, said rotor being motor driven and spaced in a housing with a substantial running clearance whereby a continuously circulating highly fluidal mill load of constant and controlled density may be maintained; and mill having a tangential material inlet the full length of the rotor; feed control means associated with said material inlet and interlocked with the reducing rotor motor drive whereby the density of the circulating mill load is regulated and maintained; a controlled tangential air inlet the full length of the reducing rotor associated with said material inlet; a material segregating chamber the full length of the reducing rotor disposed below that rotor; controlled discharge means in the bottom of said segregating chamber for controllably and progressively extracting denser material; a tangential material discharge the full length of the reducing rotor disposed above that rotor; a peripheral inlet, centripetal extraction, axial outlet horizontal axis classifying rotor disposed above the reducing rotor and associated and integrated with it; an independent variable speed motor drive for said classifying rotor; and a controlled tangential air inlet to the classifying rotor extending the full length of said rotor at the top thereof.

2. A fluid energy classifying mill according to claim 1 further characterized in that said reducing rotor is spaced from the housing with a running clearance equal to about 10 percent of the diameter of the rotor.

3. A fluid energy classifying mill according to claim 1 further characterized in that the diameter of said classifying rotor is substantially larger than the diameter of said reducing rotor.

4. A fluid energy classifying mill according to claim 3 further characterized in that the diameter of said classifying rotor is more than 25 percent greater than the diameter of said reducing rotor.

5. A fluid energy classifying mill according to claim 1 further characterized in that a controlled supplemental sifting air inlet the full length of the rotors is provided disposed between the top of the reducing rotor and the bottom of the classifying rotor.

6. A method of reducing and extracting dry pulverizable material in the subsieve particle size range which comprises continuously subjecting a highly fluidal and dispersed mass of the material to a first circulating vortex action flow including an outer vortex and a plurality of higher velocity inner vortices to reduce the material, continuously entraining the produced fines in a separate circulating vortex action flow including an outer vortex and a plurality of higher velocity inner vortices, continuously centripetally extracting and axially withdrawing the particles of desired size from said circualting flow and centrifugally throwing out the oversized particles for return by gravity and air flow to said first circulating flow.

7. A method according to claim 6 further characterized in that the denser reduced particles from said first vortex action flow are centrifugally thrown out and separately extracted.

8. A method according to claim 6 further characterized in that said returning oversize patricles are sifted by a separate air stream to free any entrained finer particles.

9. A method of reducing and extracting dry pulverizable material in the subsieve particle size range which comprises continuously subjecting a highly fluidal and dispersed mass of the material to a first circulating outer vortex flow while simultaneously subjecting the material to a plurality of high velocity inner vortex action flows to reduce the material, continuously entraining the produced fines in the upwardly rising portion of a figure eight flow from said first circulating flow for transport to a separate second circulating outer vortex flow, simultaneously subjecting the fines to a plurality of high velocity inner vortex action flows, continuously centripetally extracting and axially withdrawing the particles of desired size from said second circulating flow by suction and centrifugally throwing out the oversize particles for return by gravity and the descending portion of said figure eight air flow to said first circulating flow.

10. An open rotor dry material fluid energy classifying mill including a housing having a reducing rotor journaled therein for rotation on a horizontal axis, said reducing rotor consisting of an assembly of relatively narrow closed end radial blade rotor units, said mill having a tangential horizontal material inlet extending the full length of the rotor, a controlled tangential air inlet the full length of the reducing rotor associated with the material feed inlet to the reducing rotor, said reducing rotor being spaced in the housing with a substantial running clearance equal to about ten percent of the diameter of the rotor whereby a continuously circulating highly fluidal mill load of constant and controlled density may be maintained, a material segregating chamber disposed below the full length of the reducing rotor and discharge means in the bottom of said chamber for controllably and progressively extracting denser material, a tangential fine material discharge extending the full length of the rotor, and a peripheral inlet, centripetal extraction, axial outlet horizontal axis classifying rotor superimposed above the material discharge from the reducing rotor and associated and integrated with the reducing rotor, a separate controlled tangential air inlet through the housing to the classifying rotor, said air inlet extending the full length of the classifying rotor at the top thereof.

References Cited in the file of this patent

UNITED STATES PATENTS

| | | |
|---|---|---|
| 1,027,163 | Werner | May 21, 1912 |
| 1,317,852 | Ashenhurst | Oct. 7, 1919 |
| 1,570,037 | Blum | Jan. 19, 1926 |
| 1,760,245 | Lykken | May 27, 1930 |
| 1,807,923 | Lykken | June 2, 1931 |
| 2,050,423 | Dauber | Aug. 11, 1936 |
| 2,270,143 | Schaich | Jan. 13, 1942 |
| 2,285,429 | Frisch | June 9, 1942 |
| 2,644,643 | Frisch et al. | July 7, 1953 |
| 2,709,552 | Lecher | May 31, 1955 |
| 2,717,741 | Lykken | Sept. 13, 1955 |
| 2,754,967 | Lykken | July 17, 1956 |

FOREIGN PATENTS

| | | |
|---|---|---|
| 156,496 | Sweden | Oct. 9, 1956 |
| 673,757 | Germany | Mar. 29, 1939 |